Oct. 27, 1970 M. J. CAMPANELLA ET AL 3,537,101

HIGH SPEED ANALOG-TO-DIGITAL ENCODER

Filed Jan. 4, 1967 4 Sheets-Sheet 1

Matthew J. Campanella
James L. Christensen
Charles J. Hughes,
INVENTORS.

BY Harry M. Saragovitz
Edward J. Kelly
Herbert Berl
Robert C. Sims

HIGH SPEED ANALOG-TO-DIGITAL ENCODER

Filed Jan. 4, 1967 4 Sheets-Sheet 2

Matthew J. Campanella
James L. Christensen
Charles J. Hughes,
INVENTORS.

Harry M. Saragovitz
BY Edward J. Kelly
Herbert Berl
Robert C. Sims

HIGH SPEED ANALOG-TO-DIGITAL ENCODER

Filed Jan. 4, 1967

Matthew J. Campanella
James L. Christensen
Charles J. Hughes,
INVENTORS.
Harry M. Saragovitz
BY Edward J. Kelly
Herbert Berl
Robert C. Sims Matthew J. Campanella
James L. Christensen
Charles J. Hughes,
INVENTORS.

Harry M. Saragovitz
BY Edward J. Kelly
Herbert Berl
Robert C. Sims

United States Patent Office 3,537,101

Patented Oct. 27, 1970

3,537,101

HIGH SPEED ANALOG-TO-DIGITAL ENCODER

Matthew J. Campanella, Cherry Hill, James L. Christensen, Beverly, and Charles J. Hughes, Moorestown, N.J., assignors, by mesne assignments, to the United States of America as represented by the Secretary of the Army Filed Jan. 4, 1967, Ser. No. 607,613

Int. Cl. H03k *13/175*

U.S. Cl. 340—347 5 Claims

ABSTRACT OF THE DISCLOSURE

Several comparators are fed an analog voltage. The comparators are so biased that they successively have outputs as the analog voltage is increased in amplitude. The outputs of the comparators are connected to groups of inhibit-AND gates in such a manner that the outputs of the gates provide a binary digital output.

In advance radar instrumentation system there is a need to digitize analog signals which are of short duration. To do this requires a parallel encoder which will convert the analog signal into a digital signal at a very high speed. This must be done without prohibitive loading of the analog voltage signal and without an undue large number of components.

It is an object of the present invention to provide a practical high speed analog-to-digital encoder.

A further object of this invention is the provision of a parallel analog-to-digital encoder which does not present undue loading to its analog voltage input signal.

A still further object of the invention is the provision of a high speed parallel analog-to-digital encoder in which all the component parts of the encoder are available.

The present invention involves the use of a plurality of comparators which are each fed the analog voltage. The comparators each have a reference voltage and will have an output only when the analog voltage is greater than the reference voltage. The reference voltage is different for each comparator, and is stepped in voltage by the basic unit to be used. The comparators are arranged and numbered in sequence, whereby an output from a particular numbered comparator would mean the input analog voltage is a value of at least that particular number of units. In order to get the units digit output, the output of all the pairs of comparators (number 1 and 2; 3 and 4; 5 and 6; etc.) are connected to inhibit-AND gates. The output of these gates are sent to a digital unit output indicator. As can be seen, there will be an output on the digital unit only when the analog voltage is of an odd number of the basic units. Similar pairing is done to get the digital two's. The difference being that only numbers evenly divisible by two are paired (numbers 2 and 4; 6 and 8; 10 and 12; etc.). For the four's, only the number comparators which are divisible by four are used (numbers 4 and 8; 12 and 16; etc.). This pattern is continued until one obtains the number of places desired.

The invention further resides in and is characterized by various novel features of construction, combinations, and arrangements of parts which are pointed out with particularity in the claims annexed to and forming a part of this specification. Complete understanding of the invention and an introduction to other objects and features not specifically mentioned will be apparent to those skilled in the art to which it pertains when reference is made to the following detailed description of a specific embodiment thereof and read in conjunction with the appended drawing. The drawing, which forms a part of the specification, presents the same reference characters to represent corresponding and like parts throughout the drawing, and wherein:

Figures 1, 2, 3:
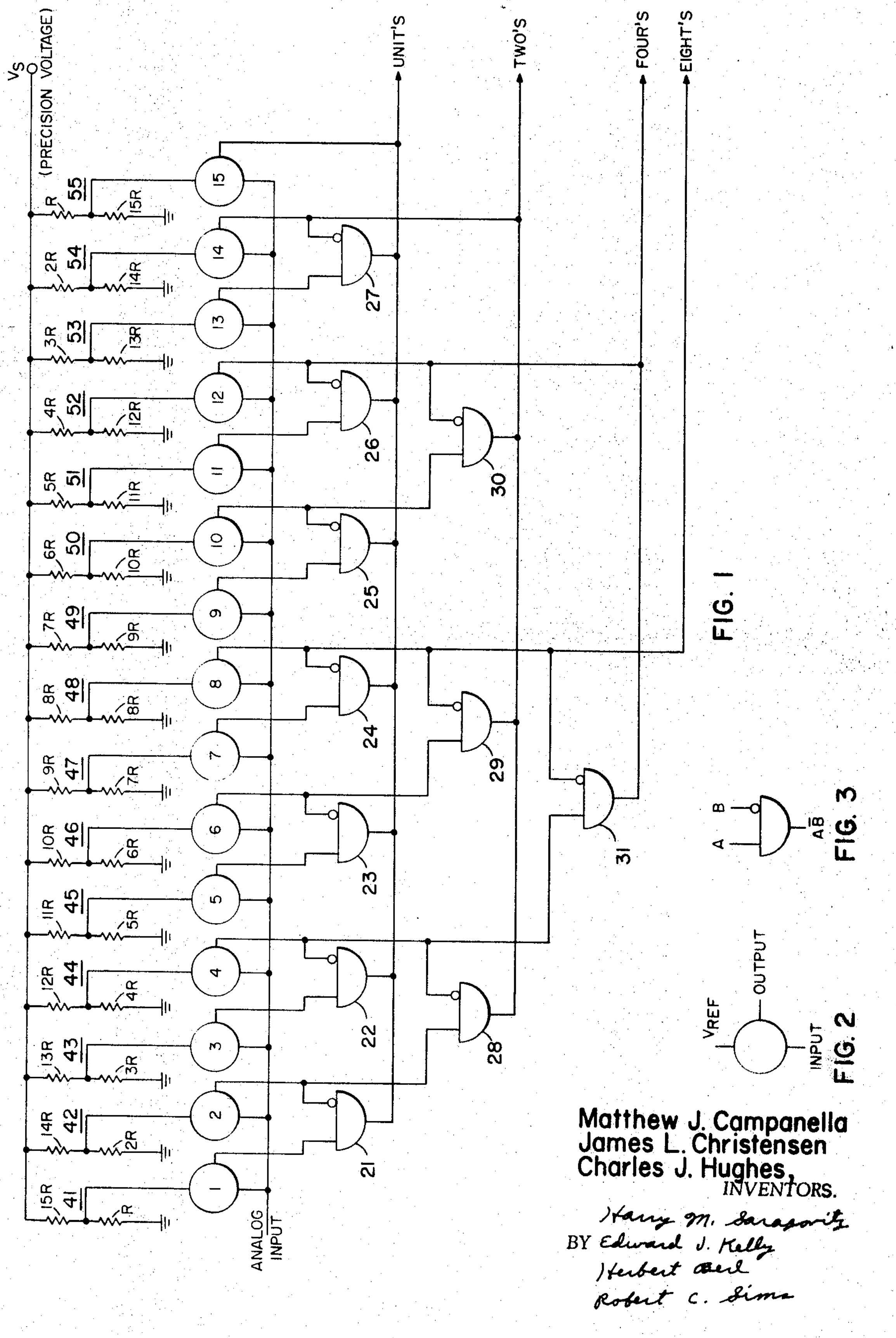
FIG. 1 is a block diagram illustrating a preferred form of the present invention.
FIG. 2 shows in greater detail the function of comparator symbol used in FIG. 1.
FIG. 3 shows in greater detail the function of the inhibit-AND gate symbol used in FIG. 1.

An analog-to-digital encoder is shown in block form in FIG. 1. It consists of fifteen comparators 1–15, 11 inhibit-AND gates 21–31, and fifteen potentiometers 41–55. The potentiometers are supplied with a precision voltage V*s* so that an accurate reference voltage will be presented to the comparators. The value of the resistors of the different potentiometers is such that the reference voltage fed to comparator 1 is $\frac{1}{16}$ of the voltage V*s*, comparator 2 is $\frac{2}{16}$, comparator 3 is $\frac{3}{16}$, etc. The operation of the comparators is made clear by FIG. 2. The analog input is compared with the reference voltage and an output is obtained when the input exceeds the reference. To allow for small variation in voltage the analog input could have a $\frac{1}{32}$ of the precision voltage V*s* added to it as a bias. The outputs of the comparators are connected to the inhibit-AND gates. The function of the inhibit-AND gate is shown in FIG. 3. If inputs A and B are sent to the inhibit-AND gate, then the gate will have an output only when A is "1" and B is "0." In Boolean algebra the output would be $A\overline{B}$. The circle at the B input indicates an inverter operation. The outputs of gates 21–27 are connected to the unit's output indicator of the encoder, the outputs of gates 28–30 are connected to the two's, the output of gate 31 is connected to the four's, and the output of comparator 8 is connected to the eight's.

The operation of the encoder can best be understood by an example. Assume that the analog input is a voltage which represents the decimal number 11. Each of the comparators 1–11 will have an output, while comparators 12–15 will not have an output. Gates 21–25 will not have an output as the output of comparators 2, 4, 6, 8, and 10 are each a "1"; however, gate 26 will have an output as its "A" input from comparator 11 is a "1" and its B input from comparator 12 is a "0." Therefore, there will be an output to the unit's. Gates 28 and 29 will not have an output as the gate is inhibited by the "1" outputs of comparators 4 and 8; however gate 30 will have an output as its input from 10 is a "1" and its input from 12 is a "0." There will, therefore, be an output on the two's of the encoder. Gate 31 will not have an output as it is inhibit by the "1" output from comparator 8. There, also, being no output from comparator 12 results in no output to the four's of the encoder. Comparator 8 will deliver an output to the eight's of the encoder. The digital output of the encoder is, therefore, 1011. This, of course, is equal to the decimal number 11. If the example were increased by one to "12" then the only change in the comparators would be that comparator 12 will now have a "1" output. However, this causes gates 26 and 30 to be inhibited and cause an output to the four's of the encoder. The digital number will now be 1100 which equals to "12."

The specific example shown in FIG. 1 only converts decimal numbers up to 15, and shows the configuration of the end connections (the direct connections of comparators 8, 12, 14, and 15 to the eight's, four's, two's, and unit's, respectively). The principles of the invention can apply to an encoder of any size. These principles being the pairing off of the comparators and sending the pairs of the inhibit-AND gates for comparison. In order to determine whether there will be a unit output of the encoder, all the comparators are paired off such that comparator 1 is paired with comparator 2; 3 with 4; 5 with 6; etc. An inhibit-AND gate, such as shown in FIG. 3, is provided for each pair. The A input will be the odd numbered comparator and the B input will be the even numbered comparator. An output from any one of the comparators will cause an output on the unit's of the encoder. To determine whether there is to be an output of the two's of the encoder, the even numbered comparators (the numbered comparators divisible by two) are paired such that comparator 2 is paired with comparator 4; 6 with 8; 10 with 12; etc. These pairs are sent to further inhibit-AND gates with the higher number of each pair being the "B" input. Any output from one of these gates will cause an output on the two's of the encoder. The pairs chosen for the four's circuit are the comparators whose numbers are evenly divisible by four, such that comparator 4 is paired with comparator 8; 12 with 16; 20 with 24; etc. These pairs are connected as inputs to still further inhibit-AND gates with the higher number of the pair being the B, or inhibit, connection to the gate. Again an output from any of the gates will cause an output on the four's of the encoder. This principle of pairing continues until the desired size is reached. These principles could also be described with respect to the inhibit-AND gates. Consider the comparators as being numbered 1–*n*, and the gates as being divided up into a plurality of groups numbered $2^0$, $2^1$, $2^2$, $2^3$ . . . $2^n$, each having the output function $A\bar{B}$. The A inputs of the gates of each group being connected to the outputs of the comparators whose numbers when increased by the group number, being considered, can be evenly divided by twice the group member. The B inputs of the gates of each group being connected to the outputs of the comparators whose numbers can be evenly divided by twice the group number. The outputs of all the gates in group 1 being fed to the unit's output of the encoder; the outputs of the gates in group 2 are fed to the two's output; outputs of group 4 are fed to the four's; group 8 to the eight's; etc. Or in other words the output of the group is fed to the digital output indication which is equal to the group's number.

The end connections will follow the same principles as that shown in FIG. 1. That being: if there is no higher comparator to pair off with an existing lower numbered comparator (for example: there is no 16 to pair off with 8 of FIG. 1) then the lower numbered comparator is connected directly to the digital place being considered (comparator 8 is connected directly to the eight's).

Figure 4A:
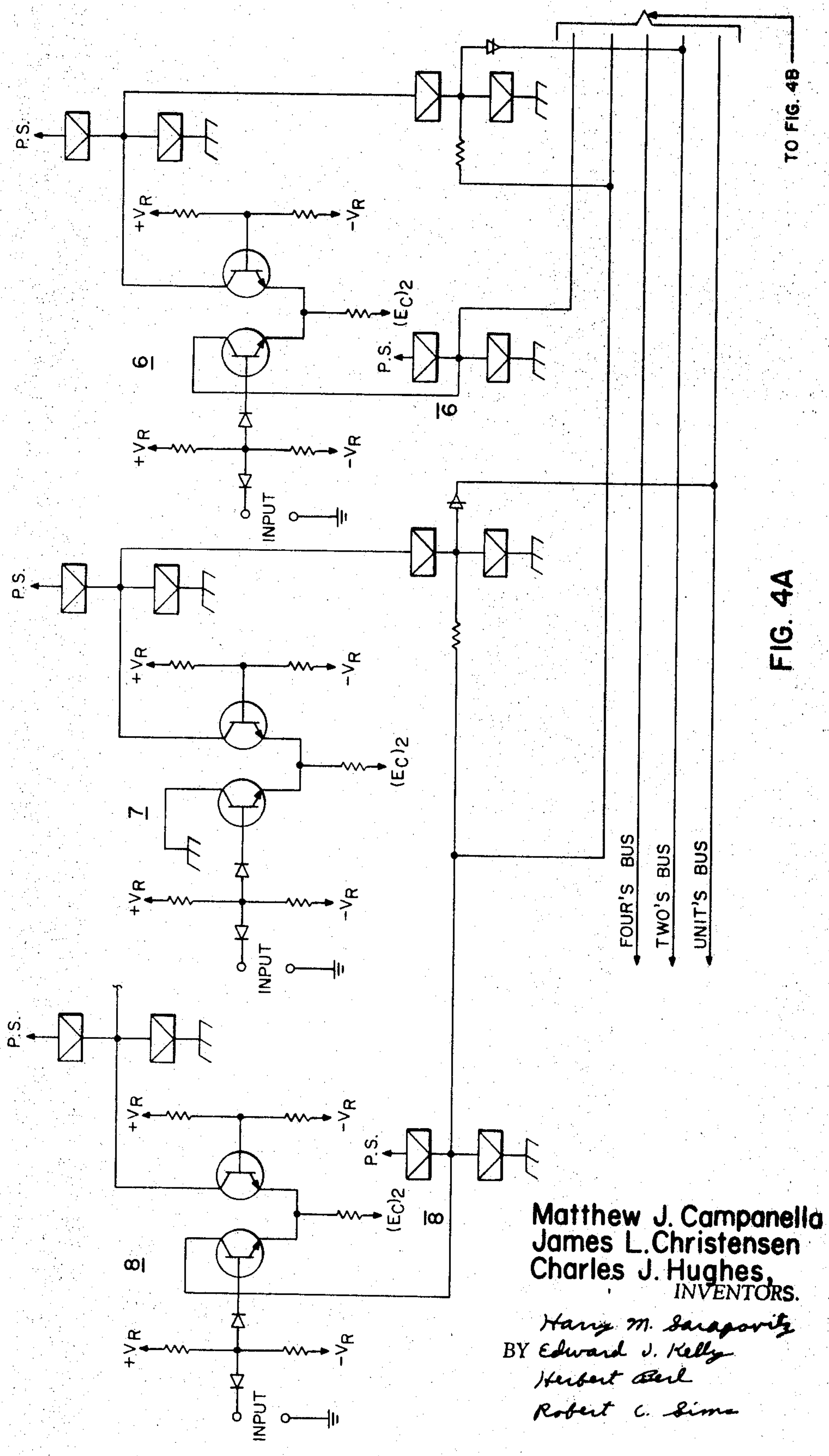
FIGS. 4A, 4B, and 4C combine to make a composite of a schematic diagram of the invention.
Figure 4B:
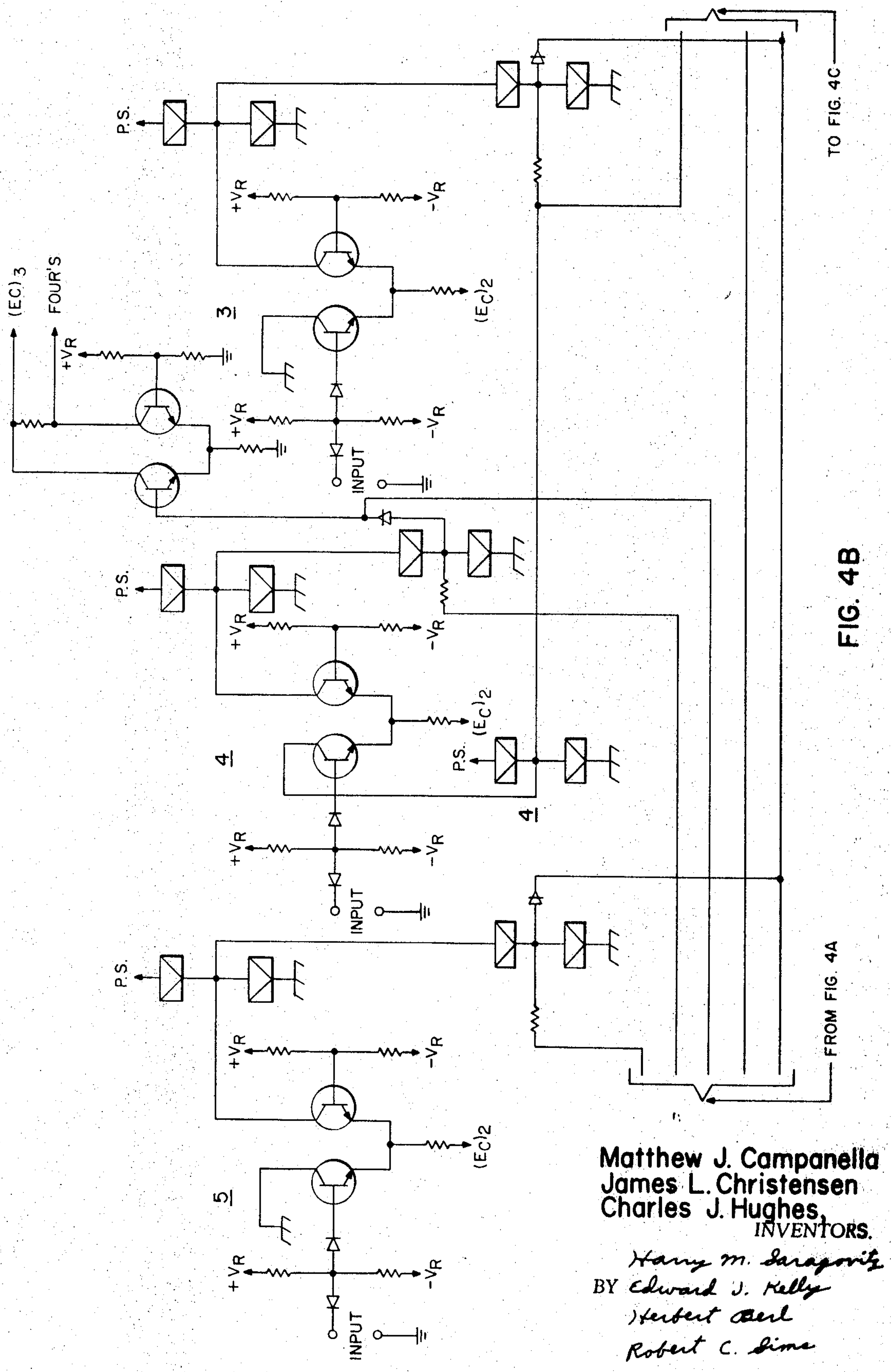
Figure 4C:
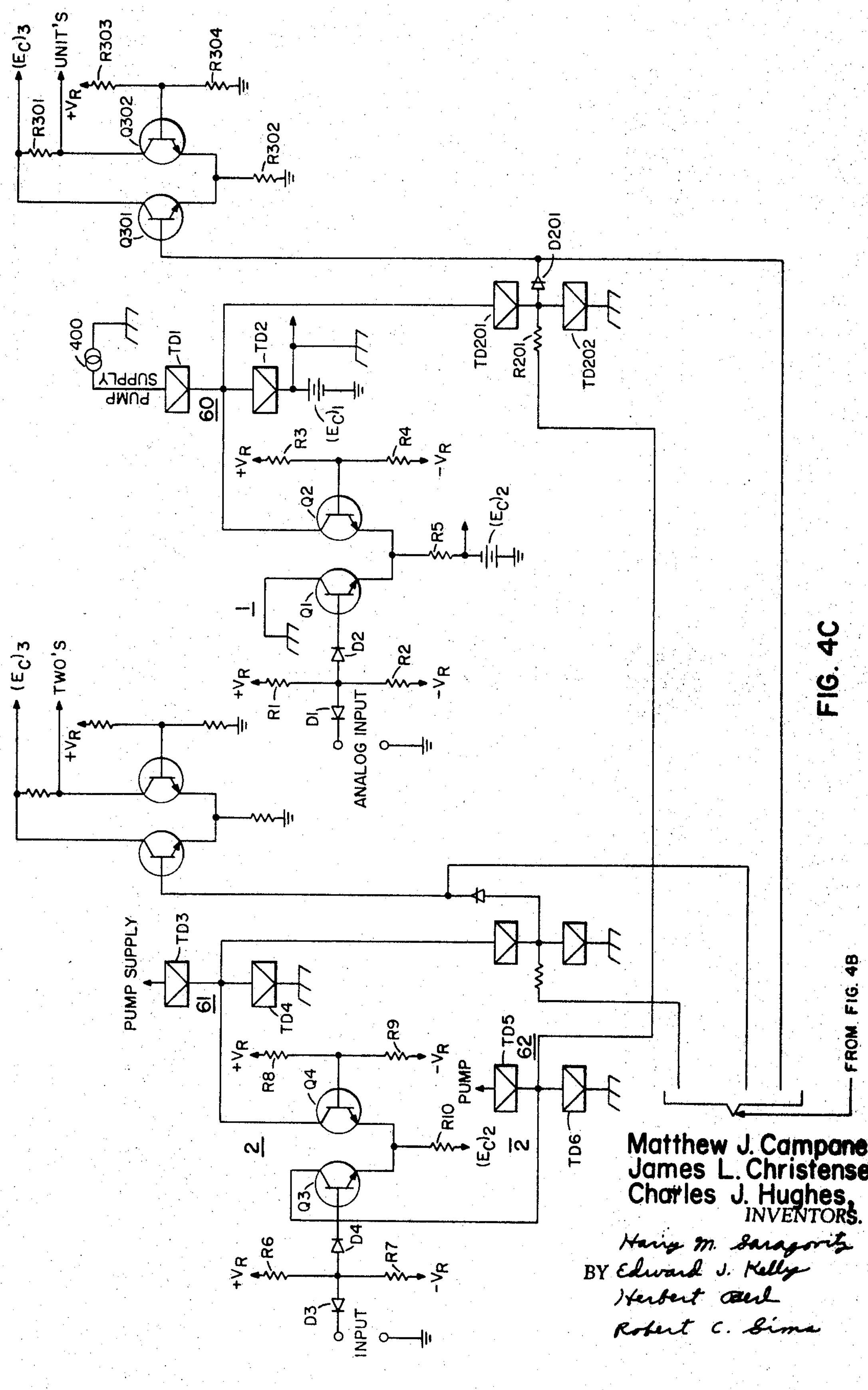

The comparators and logic of the parallel encoder of FIG. 1 can be emplemented by using a hybrid combination of transistors and tunnel diodes. The schematic of three digital places of the encoder is shown in FIG. 4A–C. In the scheme shown, high speed transistors are used for input thresholding and for output drivers, while tunnel diodes are used in the internal logic and gating of the encoder. The circuitry for an odd numbered level and even numbered level collectively form a basic cell which is repeated over many times in the encoder. In view of this, the description which follows is made with respect to the basic cell, keeping in mind that it applies to all others as well.

The input analog voltage to be encoded is applied to all the terminals labeled INPUT. In FIG. 4C, it is connected to a switching circuit consisting of transistors Q1 and Q2 of the number 1 comparator, to transistors Q3 and Q4 of comparator number 2. This switching circuit serves two purposes: (1) to isolate tunnel diode locked pairs 60, 61, and 62 circuits from the input analog voltage, and (2) to provide thresholding of the input signal. These diode locked pairs respectively are composed of diodes TD1 and TD2, TD3 and TD4, and TD5 and TD6. The impedance seen at the midpoint of each of tunnel diode locked pairs 60, 61, and 62 is so low (2–15 ohms) that when many of them are paralleled, as would be requird in this invention, the input loading presented to the analog voltage being encoded becomes prohibitive. As can be seen, each tunnel diode locked pair consists of two tunnel diodes with the anode of one diode and the cathode of the other diode connected to a common point. By using the current switching circuit in conjunction with diodes D1–D4, the input loading for the encoder can be reduced to an acceptable level. Thresholding of the input voltage is provided in the current switching circuit by virtue of its inherent operation in which current is channeled through one transistor until a reference voltage is exceeded, at which point the current is channeled to the other transistor.

The circuit for the comparator 1 shows the analog input voltage being applied to diode D1 to determine the voltage to be impressed on the base circuit of transistor Q1. As long as this voltage is below the reference voltage, say level #1 (established by the reference voltages VR and the resistors R1–R4) there will be current flow only through transistor Q2. When the input voltage exceeds level #1 by a small amount, transistor Q1 conducts and transistor current switches from Q2 to Q1. The switching of the transistor current causes the associated tunnel diode locked pair, 60 to switch to its opposite state and thereby record that the input analog voltage is greater than the reference level. When Q2 is conducting heavily, TD2 of locked pair 60 goes to its low voltage state; when Q1 is conducting heavily (Q2 conducting lightly or not at all), then TD2 goes to its high voltage state. A detailed description of the operation of the pairs of tunnel diodes may be found in Pat. No. 3,138,723 issued to Goto on June 23, 1964, and in Pat. No. 3,075,087 issued to Lo on Jan. 22, 1963.

Tunnel diode locked pairs connected as AND circuits are used to further carry out the logic of the encoder. Such a pair is shown in FIG. 4C as TD201 and TD202. The outputs of the AND gates are buffered via tunnel rectifiers D201 to a common bus which drives digit output buffer amplifiers Q301/Q302 to give a digital unit output indication. An inverted input from the output of comparator 2 is required for the AND gate according to the logic of FIG. 1. Since no inversion is obtainable within the tunnel diode locked pair itself, an inverted input is generated using the input current switching circuit of comparator 2. This is done by taking an output from the normally off transistor Q3, and sending it through a tunnel diode locked pair 62. For a fuller description of the operation of a pair of tunnel diodes as an AND gate, see copending application Ser. No. 538,165, filed Mar. 22, 1966, now Pat. No. 3,453,447, issued July 1, 1969.

It will be noticed in FIGS. 4A–4C that each tunnel diode locked pair is returned to a "signal" ground which as $(Ec)_1$ volts above chassis ground. This is done in order that the input signal may be centered about chassis ground without AC coupling. This provides more flexibility in the type of signals which may drive the encoder. The chassis ground is reestablished at the output line via an output current-switching buffer Q301/Q302 which also provides some signal amplification.

The tunnel diode locked pairs must be externally recycled to sense changes of the input signal. Otherwise, once set to a particular state, they would be insensitive to input voltage changes. The recycling is accomplished by means of a "pump" power supply 400. Essentially, the operation of the pump supply is to reduce primary circuit voltage to zero, or near zero, and back to normal at a very hight rate. During each cycle, the tunnel diode locked pair resets in accordance with the current being injected into its control point. In addition to recycling the tunnel diode locked pairs, the pump supply sets the sampling rate of the quantized input, which is developed in the input current switching circutis.

To better understand the operation of the circuit shown in FIGS. 4A–4C, an example is described below assuming the analog input voltage represents a "1." The input to comparator 1 will be above the reference voltage and will cause the switching circuit to switch whereby the current will now be flowing through transistor Q1 and Q2 will be cut off. This will cause the tunnel diode locked pair 60, which is being recycled by the pump supply, to go to its high state where TD2 is in its high voltage state. After this, the short duration analog input signal could go to zero, and the tunnel diode locked pair will stay in the same state. The output of the tunnel diode locked pair 60 serves as a pump supply to the pair TD201/TD202, which has its tunnel diodes mismatched slightly so that in the absence of a signal at its midpoint, diode TD202 will go to its low voltage state and there will be no output to the unit's bus or switching circuit Q301/Q302. However, since the analog input voltage at comparator 2 is below the reference voltage set for it, transistor Q3 will continue to conduct and will cause Goto pair TD5/TD6, which is also being recycled, to go to the high voltage state. This will provide an input to pair TD201/TD202 by way of resistor R201. Goto pair TD201/TD202 will, therefore, go to its high voltage state and provide an output for the unit's bus and the switching circuit Q301/Q302 which will amplify the output and provide a unit output indication for the encoder.

A preferred embodiment of the invention has been chosen for purposes of illustration and description. The preferred embodiment illustrated is not intended to be exhaustive nor to limit the invention to the precise form disclosed. It is chosen and described in order to best explain the principles of the invention and their application in practical use to thereby enable others skilled in the art to best utilize the invention in various embodiments and modifications as are best adapted to the particular use contemplated. It will be apparent to those skilled in the art that changes may be made in the form of the apparatus disclosed without departing from the spirit of the invention as set forth in the disclosure, and that in some cases certain features of the invention may sometimes be used to advantage without a corresponding use of other features. It is, therefore, to be understood that within the scope of the appended claims, the invention may be practiced otherwise than as specifically described. Accordingly, it is desired that the scope of the invention be limited only by the appended claims.

What is claimed is:

1. A converter system having a plurality of comparators which are each supplied with a signal voltage to be converted, said comparators each having a different reference voltage supplied thereto and having an output only when the signal voltage is greater than its reference voltage, said comparators being numbered 1–*n*, a plurality of gates each having an A input and a B input, said gates having a functional output of $A\overline{B}$, said gates being divided into a plurality of groups numbered in accordance with the sequence of $2^0, 2^1, 2^2 \ldots 2^n$, the A inputs of the gates of each group being connected to the outputs of the comparators whose numbers when increased by the group number can be evenly divided by twice the group number, the B inputs of the gates of each group being connected to the outputs of the comparators whose numbers can be evenly divided by twice the group number, and the outputs of all the gates in the same group being fed to one of a plurality of outputs of the converter system; wherein said comparators each comprise a transistorized switching means connected to its reference voltage and said signal voltage, whereby said switching means will have a first state when the signal voltage is not greater than the reference voltage and a second state when the signal voltage is greater than said reference voltage, a first set of tunnel diode locked pairs, and connections in each comparator between a common point in its locked pair and its switching means.

2. A converter system as set forth in claim 1, wherein said locked pairs are connected to supply A inputs of the gate circuits, and further connections from said switching circuit to the B inputs of the gate circuits.

3. A converter system as set forth in claim 2, further including a second set of tunnel diode locked pairs which are individually connected between the B inputs of the gate circuits and said switching means.

4. A converter system as set forth in claim 3, wherein said locked pairs are connected to a pump supply for recycling.

5. A converter system as set forth in claim 4, wherein said system is an analog-to-digitla encoder, said signal voltage represents an analog value, the outputs from the gates of each group being connected to a digital output indication of the system which is equal to the group's number, said comparators connected to each gate being related in pairs such that the number of the comparator connected to the B input is equal to the number of the comparator connected to the A input plus the group number, and wherein if only one comparator of a pair of comparators is present, said one comparator will have its output connected directly to one of the digital output indications of the encoder.

References Cited

UNITED STATES PATENTS

| | | | |
|---|---|---|---|
| 3,138,723 | 6/1964 | Goto | 307—238 |
| 3,142,056 | 7/1964 | Martin et al. | 340—347 |
| 3,241,135 | 3/1966 | Kuflik et al. | 340—347 |

MAYNARD R. WILBUR, Primary Examiner

C. D. MILLER, Assistant Examiner